(12) United States Patent
Hague et al.

(10) Patent No.: US 10,309,509 B2
(45) Date of Patent: Jun. 4, 2019

(54) RECESSED HYDRODYNAMIC BEARING FOR TURBINE DAMPER RIVETING

(71) Applicant: Schaeffler Technologies AG & Co. KG, Herzogenaurach (DE)

(72) Inventors: Shane Hague, Doylestown, OH (US); David Burky, Jr., Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 328 days.

(21) Appl. No.: 15/092,536

(22) Filed: Apr. 6, 2016

(65) Prior Publication Data

US 2017/0292592 A1 Oct. 12, 2017

(51) Int. Cl.
*F16D 13/40* (2006.01)
*F16H 45/02* (2006.01)
*F16D 33/18* (2006.01)
*F16C 17/04* (2006.01)
*F16H 41/24* (2006.01)

(52) U.S. Cl.
CPC ............ *F16H 45/02* (2013.01); *F16C 17/045* (2013.01); *F16C 17/047* (2013.01); *F16D 33/18* (2013.01); *F16H 41/24* (2013.01); *F16C 2361/65* (2013.01); *F16D 13/40* (2013.01); *F16H 2045/0205* (2013.01); *F16H 2045/0221* (2013.01); *F16H 2045/0231* (2013.01); *F16H 2045/0247* (2013.01); *F16H 2045/0263* (2013.01); *F16H 2045/0294* (2013.01)

(58) Field of Classification Search
CPC ............. F16H 45/02; F16H 2045/0221; F16H 2045/0226; F16H 2045/0284; F16D 13/40
See application file for complete search history.

(56) References Cited

U.S. PATENT DOCUMENTS

| | | | |
|---|---|---|---|
| 6,715,595 B2* | 4/2004 | Schmid | ................... F16H 45/02 192/212 |
| 2015/0192194 A1* | 7/2015 | Mencher | ........... F16F 15/13484 192/3.28 |
| 2015/0219196 A1 | 8/2015 | Heck et al. | |

* cited by examiner

*Primary Examiner* — Abiy Teka
(74) *Attorney, Agent, or Firm* — Davidson, Davidson & Kappel, LLC

(57) ABSTRACT

A drive assembly for a torque converter is provided. The drive assembly includes a turbine; a damper assembly fixed to a first side of the turbine by connectors; and a hydrodynamic bearing fixed to a second side of the turbine opposite the first side. The hydrodynamic bearing includes at least one recess formed therein receiving ends of the connectors. A method of forming a drive assembly is also provided. The method includes fixing a damper assembly cover plate to a first side of a turbine via connectors; and fixing a hydrodynamic bearing to a second side of the turbine opposite the first side. The hydrodynamic bearing including at least one recess formed therein receiving an ends the connectors. A torque converter is also provided.

19 Claims, 4 Drawing Sheets

RECESSED HYDRODYNAMIC BEARING FOR TURBINE DAMPER RIVETING

The present disclosure relates generally to torque converters and more specifically to hydrodynamic bearings of torque converters.

BACKGROUND

FIG. 1 discloses a torque converter 10 including a damper assembly 12 fixed to a turbine 14. Damper assembly 12 includes two cover plates 16, 18, with the turbine-side cover plate 16 being riveted to turbine 14 by a plurality of circumferentially spaced rivets 20. Rivets 20 are positioned radially outside of a bearing 22 and radially inside of an inner set of springs 26. Bearing 22 is sandwiched axially between turbine 14 and a stator 26 of torque converter 10. A damper flange 28 positioned axially between cover plates 16, 18 is provided with a plurality of access holes 30 circumferentially and radially aligned with rivets 20 for allowing a rivet tool to access cover plate 16 during the formation of rivets 20.

FIG. 2 discloses a plan view of drive flange 28. Drive flange 28 includes a radial innermost surface 32 and a radial outermost surface 34. Between surfaces 32, 34, drive flange 28 further includes circumferentially extending slots 36 for receiving springs 26. Holes 30 are radially aligned with inner radial edges 38 of slots 36, with each hole 30 being circumferentially between two slots 36. Due to the close proximity of holes 32 and slots 36, drive flange 28 has a limited amount of material 39 in the regions between holes 32 and slots 36, raising the stress on drive flange 28, which may force drive flange 28 to be modified during design to reduce one or both of the radial width and the circumferential length of slots 36 and result in smaller springs being used.

U.S. Pub. 2015/0219196 discloses a similar arrangement.

SUMMARY OF THE INVENTION

A drive assembly for a torque converter is provided. The drive assembly includes a turbine; a damper assembly fixed to a first side of the turbine by connectors; and a hydrodynamic bearing fixed to a second side of the turbine opposite the first side. The hydrodynamic bearing includes at least one recess formed therein receiving ends of the connectors.

A torque converter is also provided. The torque converter includes the drive assembly and a stator contacting a radially extending surface of the hydrodynamic bearing.

A method of forming a drive assembly is also provided. The method includes fixing a damper assembly cover plate to a first side of a turbine via connectors; and fixing a hydrodynamic bearing to a second side of the turbine opposite the first side. The hydrodynamic bearing including at least one recess formed therein receiving an ends the connectors.

BRIEF DESCRIPTION OF THE DRAWINGS

The present invention is described below by reference to the following drawings, in which.

DETAILED DESCRIPTION

The disclosure provides a hydrodynamic bearing including a recess to accommodate rivets, thereby eliminating need for rivet access holes. This allows rivets to be placed at same radial distance as the hydrodynamic bearing.

Figure 2:
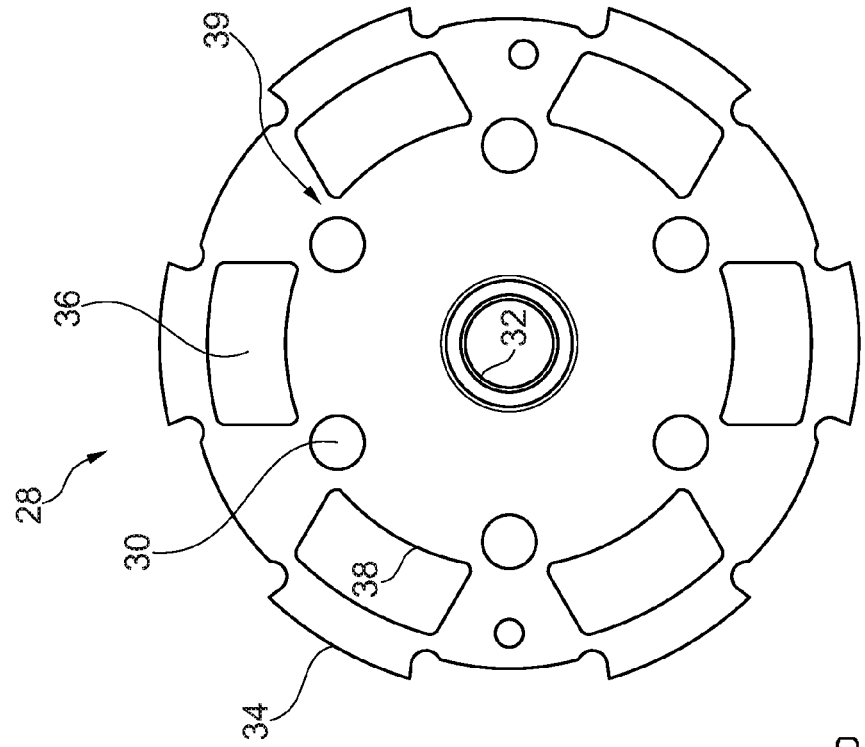
FIG. 2 schematically shows plan view of a cover plate of the torque converter shown in FIG. 1.
Figure 1:
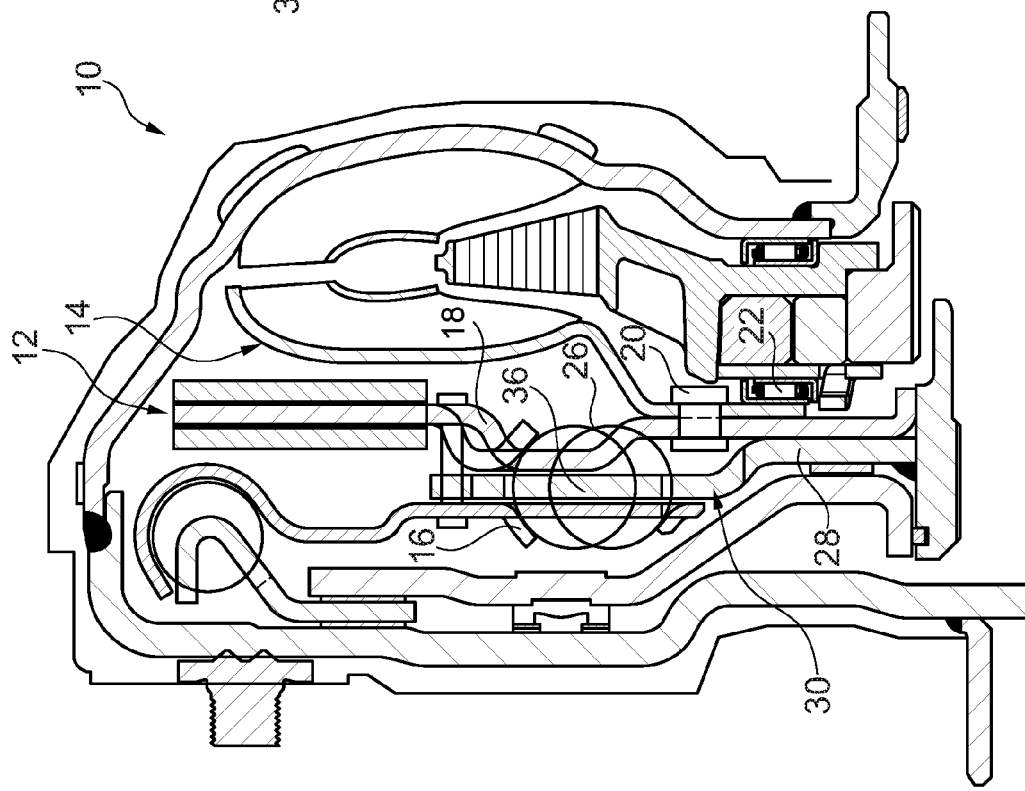
FIG. 1 schematically shows a cross-sectional side view of a known torque converter.
Figure 3:
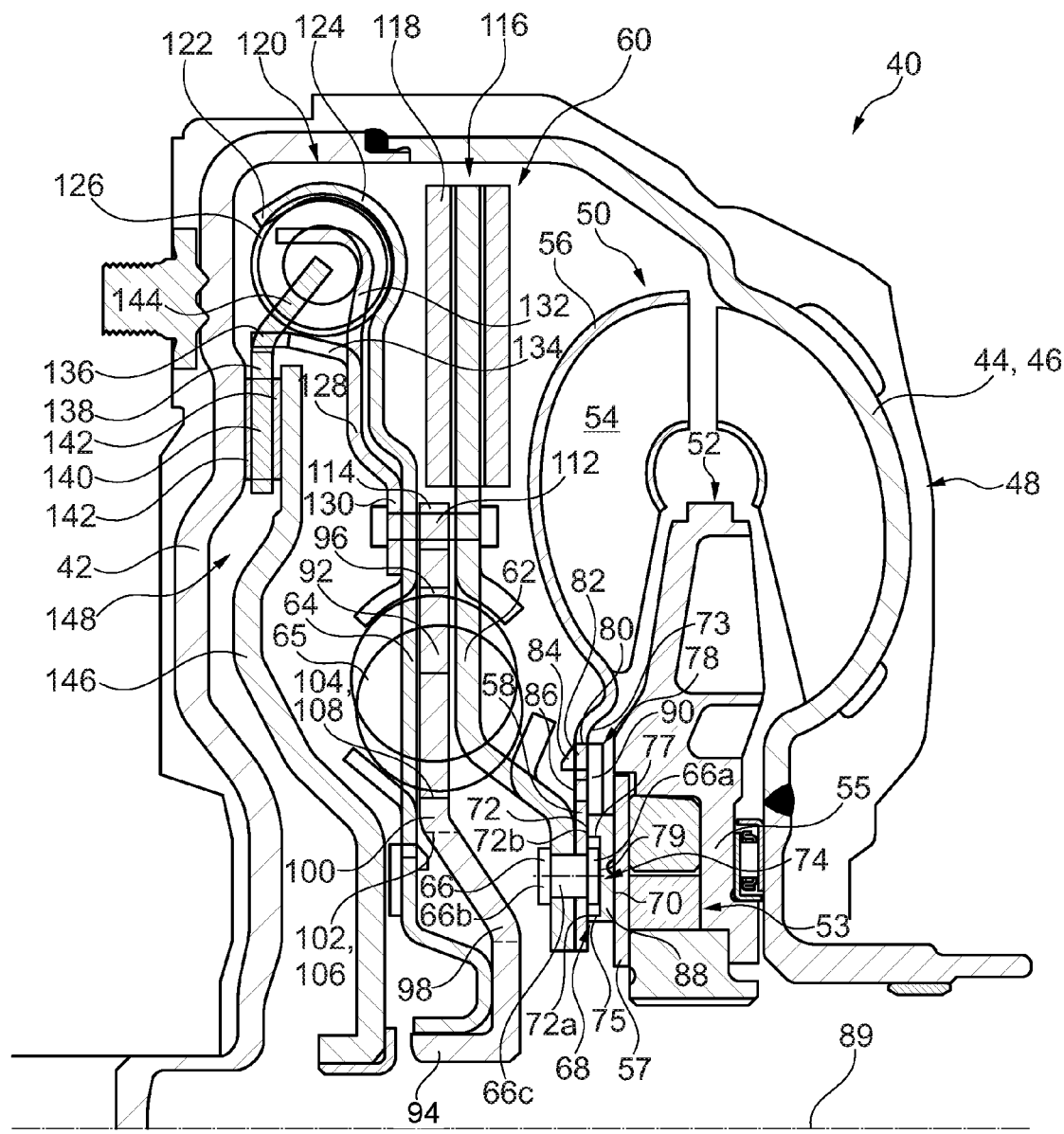
FIG. 3 schematically shows a cross-sectional side view of a torque converter in accordance with an embodiment of the present invention.

FIG. 3 shows a cross-sectional side view of a torque converter 40 in accordance with an embodiment of the present invention. Torque converter 40 includes a front cover 42 for connecting to a crankshaft of an internal combustion engine and a rear cover 44 forming a shell 46 of an impeller or pump 48. Torque converter 40 also includes a drive assembly formed by a turbine 50, which is positioned opposite impeller 48, and a damper assembly 60 fixed to turbine 50. Torque converter 40 further includes a stator 52 axially between impeller 48 and turbine 50 and a one-way clutch 53 supporting stator 52. Stator 52 includes a base 55 and a centering plate 57 holding one-way clutch 53 in place within stator 26. Turbine 50 includes a plurality of blades 54 supported on a rounded portion 56 of turbine 50 at a rear-cover side of turbine 50. Turbine 50 further includes an inner radial extension 58 protruding radially inward from rounded portion 56. On a front-cover side of turbine 50, turbine 50 is connected to damper assembly 60.

Damper assembly 60 two cover plates 62, 64 supporting an inner set of springs 65 axially therebetween, with the turbine-side cover plate 62 being riveted to turbine 50 by a plurality of circumferentially spaced rivets 66. Rivets 66 each includes a first head 66a for contacting a stator side of turbine 50, a second head 66b for contacting a front-cover side of first cover plate 62 and a shaft 66c connecting heads 66a, 66b extending through rivet holes formed in first cover plate 62 and turbine 50.

A hydrodynamic bearing 68 is sandwiched axially between inner radial extension 58 of turbine 50 and stator 52. Bearing 68 includes a first radially extending surface 70 contacting stator 52 and second radially extending surface 72 contacting a stator-side surface 73 of inner radial extension 58 of turbine 50. More specifically, first radially extending surface 70 contacts a centering plate 57 of stator 52. In one embodiment, first radially extending surface 70 is formed of a wear resistant material, for example a plastic in the form of a polyether ether ketone (PEEK) or a polyamide-imide produced by TORLON. Second radially extending surface 72 includes at least one recess 74 formed therein for receiving an end of rivets 66, more specifically first heads 66a of rivets 66. Recess 74 divides second radially extending surface 72 into a radial inner section 72a radially inside of recess 74 and a radial outer section 72b radially outside of recess 74. Recess 74 is defined by two axially extending walls 75, 77 extending from second radially extending surface 72 and a radially extending wall 79 extending from wall 75 to wall 77. The radially inner wall 75 connects with radial inner section 72a and the radially outer wall 77 connects with radial outer section 72b. In one embodiment, a single recess 74 extends circumferentially in bearing 68 and receives all of the first heads 66a. In another embodiment, a plurality of recesses 74 are formed in bearing 68, each for receiving one of first heads 66a.

Bearing 68 further includes a plurality circumferentially spaced connectors 78 for passing through circumferentially spaced holes 80 formed in inner radial extension 58 of turbine 50 to connect bearing 68 to turbine 50. Connectors 78 include posts 82 passing through holes 80 and clips 84 that extend radially inward from post 82 to contact a damper-side surface 86 of turbine 50 to hold bearing 68 in place on turbine 50. Connectors 78 are radially outside of a disc-shaped rivet receiving portion 88 of bearing 68, which forms a disc extending about center axis 89 of torque converter 40, and are each connected to rivet receiving portion 88 by a radial extension 90. Recess 74 in rivet receiving portion 88 allows bearing 68 to be radially aligned with rivets 66. Bearing 68 thus allows rivets 66 to be further radially offset from springs 65 than in torque converter 10 described above.

Figure 4:
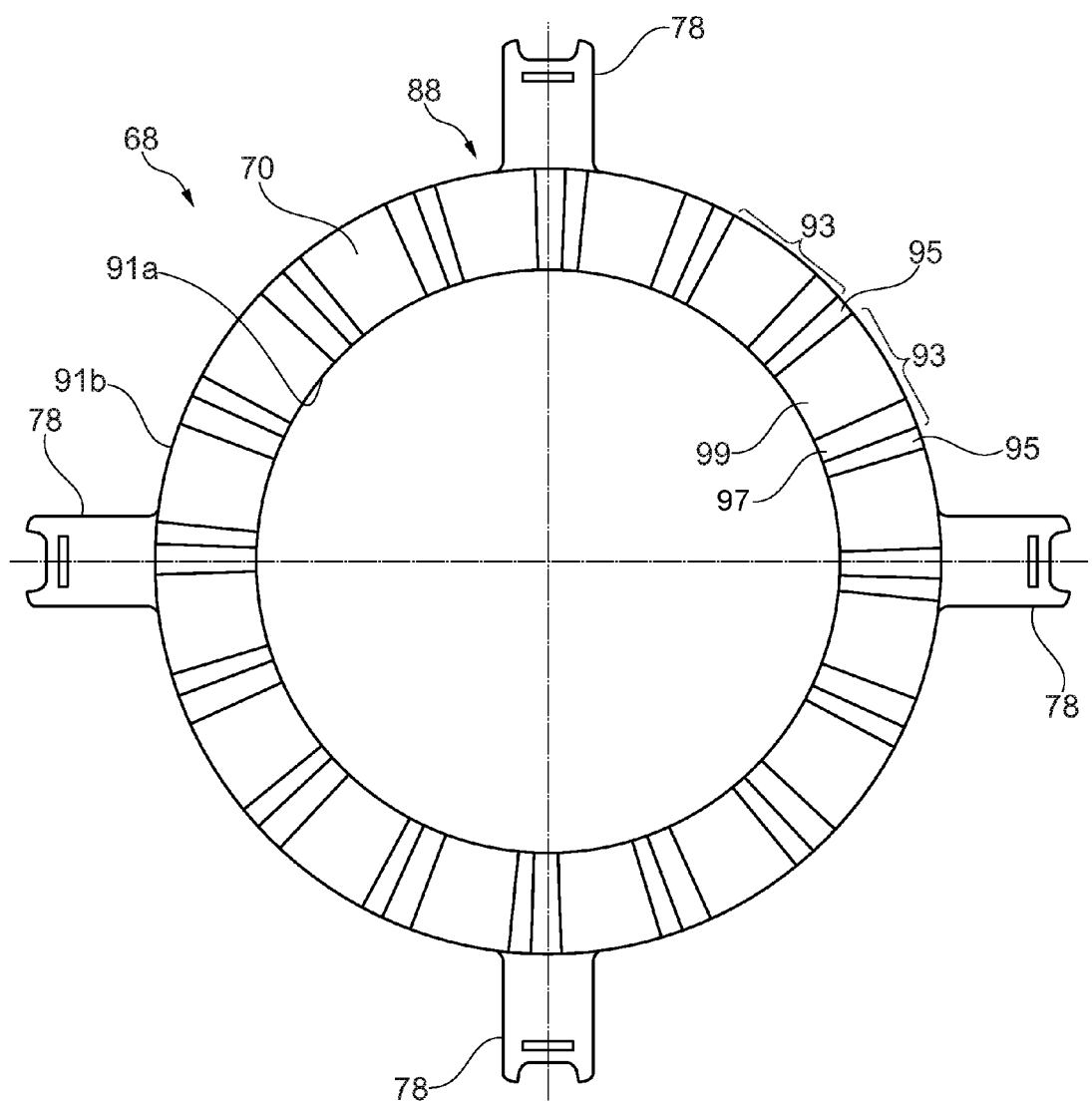
FIG. 4 shows a plan view of a bearing of the torque converter shown in FIG. 3.
Figure 5:
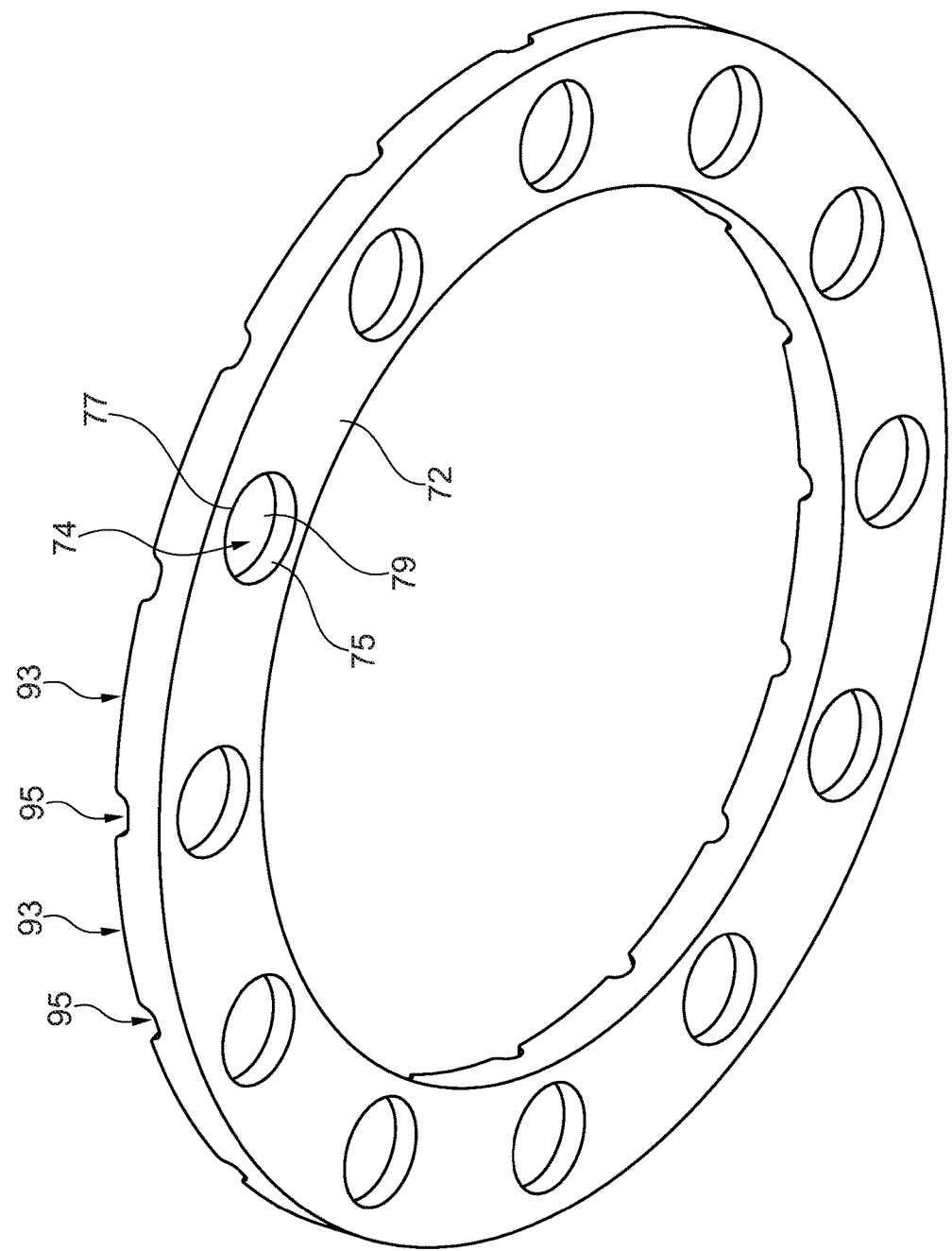
FIG. 5 shows a perspective view of a rivet receiving portion the bearing being provided with a plurality of recesses.

FIG. 4 shows a plan view of bearing 68 from radially extending surface 70, which extends from an inner circumferential surface 91a of disc-shaped rivet receiving portion 88 to an outer circumferential surface 91b of disc-shaped rivet receiving portion 88. Radially extending surface 70 is formed for example in the same manner as the bearing in U.S. Pub. 2015/0184701, which is hereby incorporated by reference herein, and includes a plurality of circumferentially spaced raised arc-shaped sections 93 extending from inner circumferential surface 91a to an outer circumferential surface 91b. Alternately arranged between sections 93, radially extending surface 70 also includes a plurality of circumferentially spaced grooves 95 extending from inner circumferential surface 91a to an outer circumferential surface 91b. Sections 93 each include a flat surface 97 and a tapered surface 99, which gradually decreases in thickness as tapered surface 99 extends circumferentially from flat surface 97 to groove 95. FIG. 5 shows a perspective view of rivet receiving portion 88 being provided with a plurality of recesses 74 in radially extending surface 72, each for receiving one of first heads 66a. In FIG. 5, connectors 78 are omitted. As noted above, each recess 74 is defined by axially extending walls 75, 77 extending from second radially extending surface 72 and radially extending wall 79 extending from wall 75 to wall 77. Walls 75, 77 join together to form a cylindrical shape and wall 79 has a circular shape.

Referring back to FIG. 3, damper assembly 60 further includes a drive flange 92 positioned axially between cover plate 62, 64. Drive flange 92 includes an inner radial end 94 configured for nonrotatably connecting to a transmission input shaft. Cover plates 62, 64 transfer torque from turbine 50 to drive flange 92 via springs 65. Drive flange 92 in turn drives the transmission input shaft. Drive flange 92 further includes circumferentially extending slots 96 for receiving springs 65. Radially inside of slots 96, drive flange 92 further includes access holes 98 radially and circumferentially aligned with rivets 66 for allowing a rivet tool to access cover plate 62 during the formation of rivets 66. Access holes 98 are also radially aligned with the at least one recess 74, and in embodiments where there are multiple recesses 74, access holes 98 are each circumferentially aligned with one of recesses 74. Because rivets 66 are further radially offset from springs 65, access holes 92 are moved radially inward compared to torque converter 10 described above. Accordingly, in the cross-sectional view shown in FIG. 3, a radial span 100 is provided radially between each slot 96 and holes 98. Radial span 100 extends from a first radial location 102 that is radially aligned with a radial outer edge 104 of access hole 98 to a second radial location 106 that is radially aligned with a radial inner edge 108 of slot 96.

Radially outside of springs 65, cover plates 62, 64 are riveted together by a plurality of circumferentially spaced rivets 112. Rivets 112 pass through cover plates 62, 64 into circumferential spaces formed between outer tabs 114 extending from a radial outer end of drive flange 92. At a radially outer end 116 of cover plate 62, radially outside of rivets 112, damper assembly 60 includes a centrifugal pendulum vibration absorber 118. A radially outer end 120 of cover plate 64 forms a spring retainer 122 Spring retainer 122 includes a rounded portion 124 following a contour of approximately half of an outer circumference of springs 126 forming an outer set of springs.

A further plate 128 is riveted to cover plates 62, 64 at a front cover side of second cover plate 64. A radially inner section 130 of plate 128 contacts second cover plate 64. From radially inner section 130, plate 128 extends radially outward towards springs 126 and splits into two sets of projections 132, 134 that are circumferentially spaced from each other. Radially outer projections 132 extend radially outward away from radially inner section 130 into circumferential spaces formed between springs 126 to form overload stops for springs 126. Radially inner projections 134 extend axially away from radially inner section 130 toward front cover 42 and include axially extending teeth 136 extending into a clutch plate 138. Clutch plate 138 includes a radially aligned section 140 supporting friction material 142 on both radially extending surfaces thereof and angled projections 144 extending axially and radially away from radially aligned section 140 and into the spaces circumferentially between spring 126. Teeth 136 of radially inner projections 134 extend into spaces circumferentially between angled projections 144. Between damper assembly 60 and clutch plate 138, a piston 146 is provided for engaging clutch plate 138 and sandwiching clutch plate 138 between front cover 42 and piston 146. Piston 146 and clutch plate 138 form a lockup clutch 148 for drivingly coupling turbine 50 to front cover 42 via damper assembly 60. Fluid pressure differences between a front cover side of piston 146 and a rear cover side of piston 146 control whether clutch plate 138 is engaged with or is disengaged from front cover 42 via piston 146.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a torque converter comprising:
   a turbine;
   a damper assembly fixed to a first side of the turbine by connectors; and
   a hydrodynamic bearing fixed to a second side of the turbine opposite the first side, the hydrodynamic bearing including at least one recess formed therein receiving ends of the connectors, the hydrodynamic bearing including an inner circumferential surface, an outer circumferential surface, a first radially extending surface extending from the inner circumferential surface to the outer circumferential surface and a second radially extending surface extending from the inner circumferential surface to the outer circumferential surface, the first radially extending surface configured for contacting a stator, the second radially extending surface contacting the turbine, the second radially extending surface including the at least one recess, the first radially extending surface including a plurality of circumferentially spaced grooves extending from the inner circumferential surface to the outer circumferential surface.

2. The drive assembly as recited in claim 1 wherein the at least one recess includes first and second axially extending walls extending from the second radially extending surface and a radially extending wall extending from the first axially extending wall to the second axially extending wall.

3. The drive assembly as recited in claim 2 wherein the first and second axially extending walls join together to form a cylindrical shape and the radially extending wall has a circular shape.

4. The drive assembly as recited in claim 1 wherein the connectors are rivets, each rivet including a head, each of the heads being received in the recess.

5. The drive assembly as recited in claim 1 wherein the hydrodynamic bearing includes bearing connectors passing through holes formed in the turbine to fix the hydrodynamic bearing to the turbine.

6. The drive assembly as recited in claim 1 wherein the damper assembly includes a first cover plate, the first cover plate receiving the connectors to fix the damper assembly to the turbine.

7. The drive assembly as recited in claim 6 wherein the damper assembly includes a second cover plate and fixed to the first cover plate and a drive flange axially between the first cover plate and the second cover plate, the drive flange including access holes radially aligned with the at least one recess.

8. A torque converter comprising:
the drive assembly as recited in claim 1; and
a stator contacting a radially extending surface of the hydrodynamic bearing.

9. A method of forming a drive assembly comprising:
fixing a damper assembly cover plate to a first side of a turbine via connectors; and
fixing a hydrodynamic bearing to a second side of the turbine opposite the first side, the hydrodynamic bearing including at least one recess formed therein receiving ends of the connectors, the hydrodynamic bearing including an inner circumferential surface, an outer circumferential surface, a first radially extending surface extending from the inner circumferential surface to the outer circumferential surface and a second radially extending surface extending from the inner circumferential surface to the outer circumferential surface, the first radially extending surface configured for contacting a stator, the second radially extending surface contacting the turbine, the second radially extending surface including the at least one recess, the first radially extending surface including a plurality of circumferentially spaced grooves extending from the inner circumferential surface to the outer circumferential surface.

10. The method as recited in claim 9 wherein the hydrodynamic bearing includes a first radially extending surface configured for contacting a stator and a second radially extending surface contacting the turbine.

11. The method as recited in claim 10 wherein the at least one recess includes first and second axially extending walls extending from the second radially extending surface and a radially extending wall extending from the first axially extending wall to the second axially extending wall.

12. The method as recited in claim 11 wherein the first and second axially extending walls join together to form a cylindrical shape and the radially extending wall has a circular shape.

13. The method as recited in claim 9 wherein the connectors are rivets, each rivet including a head, each of the heads being received in the at least one recess.

14. The method as recited in claim 9 wherein the fixing a hydrodynamic bearing to a second side of the turbine includes passing bearing connectors of the hydrodynamic bearing through holes formed in the turbine.

15. The method as recited in claim 9 further comprising, before the fixing the damper assembly cover plate to the first side of the turbine, coupling a drive flange to the damper assembly cover plate, the drive flange including access holes, the drive flange being coupled to the damper assembly cover plate such that the access holes are aligned with holes in the damper assembly cover plate.

16. The method as recited in claim 15 wherein the fixing the damper assembly cover plate to the first side of the turbine includes passing a tool through each of the access holes to fix each of the connectors in the holes in the damper assembly cover plate and holes in the turbine.

17. The drive assembly as recited in claim 1 wherein the first radially extending surface of the hydrodynamic bearing includes a plurality of raised arc-shaped sections circumferentially spaced apart by the circumferentially spaced grooves, the plurality of raised arc-shaped sections extending from the inner circumferential surface to the outer circumferential surface.

18. The drive assembly as recited in claim 17 wherein the plurality of circumferentially spaced raised arc-shaped sections each include a flat surface and a tapered surface such that each of the plurality of circumferentially spaced raised arc-shaped sections gradually decreases in thickness as the tapered surface extends circumferentially from a corresponding one of the flat surfaces to a corresponding one of the grooves.

19. A drive assembly for a torque converter comprising:
a turbine;
a damper assembly fixed to a first side of the turbine by connectors; and
a hydrodynamic bearing fixed to a second side of the turbine opposite the first side, the hydrodynamic bearing including at least one recess formed therein receiving ends of the connectors,
wherein the damper assembly includes a first cover plate, the first cover plate receiving the connectors to fix the damper assembly to the turbine,
wherein the damper assembly includes a second cover plate and fixed to the first cover plate and a drive flange axially between the first cover plate and the second cover plate, the drive flange including access holes radially aligned with the at least one recess.

* * * * *